United States Patent
Park et al.

(10) Patent No.: US 11,824,435 B2
(45) Date of Patent: Nov. 21, 2023

(54) INTEGRATED DC/DC AND AC/DC CONVERTER SYSTEM

(71) Applicant: Korea Aerospace Research Institute, Daejeon (KR)

(72) Inventors: Jeong Eon Park, Daejeon (KR); Gun Woo Moon, Daejeon (KR); Ju Hyun Bae, Daejeon (KR); Tae Woo Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 176 days.

(21) Appl. No.: 17/358,823

(22) Filed: Jun. 25, 2021

(65) Prior Publication Data
US 2022/0140722 A1    May 5, 2022

(30) Foreign Application Priority Data
Nov. 4, 2020 (KR) .................. 10-2020-0146305

(51) Int. Cl.
*H02M 1/10* (2006.01)
*H02M 3/335* (2006.01)
(Continued)

(52) U.S. Cl.
CPC .............. *H02M 1/10* (2013.01); *B60L 53/11* (2019.02); *B60L 53/22* (2019.02); *B60L 53/51* (2019.02);
(Continued)

(58) Field of Classification Search
CPC ...... H02M 1/10; H02M 3/33576; H02M 1/44; H02M 3/28; H02M 7/219; H02M 1/0085; H02M 1/4233; H02M 3/158; H02M 1/007; B60L 53/11; B60L 53/22; B60L 53/51; B60L 2210/10; B60L 2210/30; B60L 53/14; H02J 7/02; H02J 7/0013; H02J 2207/40;
(Continued)

(56) References Cited

U.S. PATENT DOCUMENTS 6,160,722 A * 12/2000 Thommes ............... H02J 9/061
                                                              307/68
6,483,730 B2 * 11/2002 Johnson, Jr. ........... H02M 7/538
                                                              363/58
(Continued)

FOREIGN PATENT DOCUMENTS

KR      102034431 B1    10/2019
WO    WO 2011/074680 A1    6/2011

OTHER PUBLICATIONS

Y. Jeong et al., "High Efficiency Zero-Voltage-Switching Totem-Pole Bridgeless Rectifier with Integrated Inrush Current Limiter Circuit." IEEE Trans. on Industrial Electronics, vol. 67, No. 9, 2020.

*Primary Examiner* — Yusef A Ahmed
(74) *Attorney, Agent, or Firm* — Blank Rome LLP

(57) ABSTRACT

Provided is an integrated DC/DC and AC/DC converter system including a main relay selectively connected to any one of an AC power supply unit and a DC power supply unit and a controller connecting the main relay to the AC power supply unit or the DC power supply unit. Electrical energy based on the AC power output from the AC power supply and electrical energy based on DC power output from the DC power supply unit may be selectively provided to a load.

7 Claims, 13 Drawing Sheets

(51) Int. Cl.
  *H02J 7/02* (2016.01)
  *B60L 53/22* (2019.01)
  *B60L 53/51* (2019.01)
  *B60L 53/10* (2019.01)

(52) U.S. Cl.
  CPC ........... *H02J 7/02* (2013.01); *H02M 3/33576* (2013.01); *B60L 2210/10* (2013.01); *B60L 2210/30* (2013.01)

(58) Field of Classification Search
  CPC ......... H02J 2310/48; H02J 7/35; Y02B 70/10; Y02T 10/7072; Y02T 10/92; Y02T 10/70; Y02T 90/14; Y02T 90/12
  See application file for complete search history.

(56) References Cited

U.S. PATENT DOCUMENTS

| | | | | |
|---|---|---|---|---|
| 7,050,312 | B2* | 5/2006 | Tracy | H02M 7/797 307/66 |
| 7,944,089 | B2* | 5/2011 | Lu | H02J 9/062 307/66 |
| 9,106,103 | B2* | 8/2015 | Paulakonis | H02J 9/062 |
| 10,193,437 | B1* | 1/2019 | Hari | H02M 7/217 |
| 2002/0118556 | A1* | 8/2002 | Johnson, Jr. | H02M 1/10 363/123 |
| 2003/0038612 | A1* | 2/2003 | Kutkut | H02M 3/33561 320/140 |
| 2004/0160789 | A1* | 8/2004 | Ying | H02M 1/4216 363/16 |
| 2011/0019454 | A1* | 1/2011 | Fotherby | H02M 1/08 363/132 |
| 2011/0133558 | A1* | 6/2011 | Park | H02J 3/32 307/66 |
| 2011/0227418 | A1* | 9/2011 | Pyboyina | H02J 9/062 307/75 |
| 2012/0155119 | A1* | 6/2012 | Kim | H02M 3/33561 363/17 |
| 2013/0026835 | A1* | 1/2013 | Ghosh | H02M 1/10 307/64 |
| 2013/0038130 | A1* | 2/2013 | Lai | H02M 7/487 307/80 |
| 2013/0076141 | A1* | 3/2013 | Paulakonis | H02J 9/062 307/64 |
| 2013/0155736 | A1* | 6/2013 | Ilic | H02M 1/36 363/71 |
| 2013/0257301 | A1* | 10/2013 | Tran | H02M 1/36 315/200 R |
| 2015/0076914 | A1* | 3/2015 | Tsai | H02J 9/06 307/66 |
| 2019/0312526 | A1* | 10/2019 | Lee | H01L 31/042 |
| 2020/0099311 | A1* | 3/2020 | Askarianabyaneh | H02M 7/217 |
| 2020/0127581 | A1* | 4/2020 | Chen | H02M 7/4826 |
| 2020/0195129 | A1* | 6/2020 | Woo | H02M 1/4208 |
| 2020/0321880 | A1* | 10/2020 | Lee | H02M 3/156 |
| 2021/0039506 | A1* | 2/2021 | Lee | B60L 50/61 |
| 2021/0281094 | A1* | 9/2021 | Kwon | H02M 1/007 |
| 2021/0296982 | A1* | 9/2021 | Hafezinasab | H02M 3/1582 |
| 2022/0109373 | A1* | 4/2022 | Fu | H02M 7/797 |
| 2022/0181905 | A1* | 6/2022 | Agrawal | H02J 9/068 |
| 2022/0399751 | A1* | 12/2022 | Peramsetty | H02J 9/068 |
| 2022/0402390 | A1* | 12/2022 | Smolenaers | H02J 3/322 |
| 2023/0023934 | A1* | 1/2023 | Vahid | H02M 1/0083 |

* cited by examiner

PRIOR ART

PRIOR ART

PRIOR ART

INTEGRATED DC/DC AND AC/DC CONVERTER SYSTEM

CROSS-REFERENCE TO RELATED APPLICATIONS

This application claims priority under 35 U.S.C. § 119 to Korean Patent Application No. 10-2020-0146305, filed on Nov. 4, 2020, in the Korean Intellectual Property Office, the disclosure of which is incorporated herein by reference in its entirety.

TECHNICAL FIELD

The following disclosure relates to an integrated DC/DC and AC/DC converter system capable of selectively providing AC power-based electrical energy output from an AC power supply unit and DC power-based electrical energy output from a DC power supply unit to a load.

BACKGROUND

An electric vehicle is a kind of eco-friendly vehicle and is driven using electric energy instead of fossil fuel. Demand for such electric vehicles is on the rise due to various factors such as global warming, international oil prices, and tightening fuel efficiency regulations in major countries.

Charging methods of electric vehicles are classified into a fast charging method and a slow charging method. The fast charging method refers to a method of charging a battery mounted in an electric vehicle by converting AC power supplied from a power supplier (e.g., Korea Electric Power Corporation) or DC power of new renewable energy into DC power having an appropriate magnitude. With the fast charging method, a charging speed is relatively high because a rectifier and a DC-DC converter are located outside an electric vehicle. The slow charging method refers to a method in which, when AC power supplied from a power supplier is supplied to an electric vehicle, an on board charger (OBC) provided in the electric vehicle converts AC power into DC power to charge the battery. In this slow charging method, power conversion occurs inside the electric vehicle, and here, electric vehicles may structurally convert only a small amount of power, and thus, the charging speed is relatively slow.

FIG. 1 is a view illustrating a rectifier stage and a power factor correction (PFC) stage of a related art OBC.

As shown in FIG. 1, the rectifier stage of the related art OBC includes an AC power supply unit $V_{Grid}$ outputting AC power and bridge diodes $D_{B1}$, $D_{B2}$, $D_{B3}$, and $D_{B4}$ connected to the AC power supply unit $V_{Grid}$. The PFC stage includes an inductor $L_1$, a switch $SW_1$, and a diode $D_1$.

An AC voltage of 220V output from the AC power supply unit $V_{Grid}$ is rectified by the bridge diodes $D_{B1}$, $D_{B2}$, $D_{B3}$, and $D_{B4}$. Thereafter, the voltage rectified through the bridge diodes $D_{B1}$, $D_{B2}$, $D_{B3}$, and $D_{B4}$ is corrected in power factor at the PFC stage and boosted. Power factor refers to a ratio of active power to apparent power in an AC circuit. A low power factor in an AC circuit means that a magnitude of apparent power is large compared to active power and, in this case, electromagnetic interference (EMI) occurs due to a high-frequency component of the AC, and an effective current increases to cause significant conduction loss and turn-off loss. Accordingly, in order to correct the power factor in the AC circuit, a PFC converter is required.

The PFC converter may be largely divided into a passive PFC converter and an active PFC converter, and in the OBC, a boost PFC converter, which is a type of an active PFC converter, is widely used. The boost PFC converter has an inductor on an input power side so that a current is continuously conducted, and therefore, a size of the input filter is small and crossover distortion is small. The boost PFC converter used in the OBC mainly operates in a continuous conduction mode (CCM). This is because a size of an EMI filter and conduction loss and turn-off loss of a switch are small in the CCM, compared to a critical conduction mode (CRM).

FIG. 1 shows a boost PFC converter in which the PFC stage includes the inductor $L_1$, the switch $SW_1$, and the diode $D_1$. A PFC controller controls a switching operation of the switch $SW_1$. When the PFC controller turns the switch $SW_1$ on, the input current based on the voltage rectified through the bridge diodes $D_{B1}$, $D_{B2}$, $D_{B3}$, and $D_{B4}$ flows through a path □ in FIG. 1 and electrical energy is stored in the inductor $L_1$ (build-up mode). Thereafter, when the PFC controller turns the switch $SW_1$ off, the electrical energy stored in the inductor $L_1$ and electrical energy based on the input current are stored in a link capacitor $C_1$ through a path □ in FIG. 1. That is, the AC power-based electrical energy output from the AC power supply unit $V_{Grid}$ is stored in the link capacitor $C_1$.

The load $R_1$ is provided with AC power-based electrical energy stored in the link capacitor C1. FIG. 1 shows that the load $R_1$ includes a resistance component, but the load $R_1$ may be a battery mounted in an electric vehicle instead of the resistance component. In this case, the battery mounted in the electric vehicle may be charged by the electric energy based on the AC power stored in the link capacitor $C_1$.

Meanwhile, FIG. 2 is a view illustrating a related art solar power generation system.

As shown in FIG. 2, the related art solar power generation system includes a solar panel corresponding to a DC power supply unit and a boost converter connected to the solar panel. Here, the boost converter includes an inductor $L_2$, a switch $SW_2$, and a diode $D_2$.

A maximum power point tracking (MPPT) controller shown in FIG. 2 controls the boost converter to change an input voltage $V_{PV}$ of the boost converter so that DC power generated in the solar panel is maximized according to a temperature of the solar panel and the amount of insolation incident on the solar panel.

A perturb and observe (P&O) method may be used as one of the MPPT control methods performed by the MPPT controller. However, the MPPT control method performed by the MPPT controller is not necessarily limited to only the P&O method, and various control methods such as an incremental conductance (InCond) method may be used. An MPPT control algorithm for implementing the P&O method, the InCond method, and the like may be previously stored in the MPPT controller. The MPPT controller acquires the input voltage ($V_{PV}$) of the boost converter (equal to an output voltage of the solar panel) and an input current ($I_{PV}$) of the boost converter (equal to an output current of the solar panel) to calculate electric power of the solar panel, and changes the input voltage $V_{PV}$ of the boost converter so that maximum electric power may be generated from the solar panel according to the pre-stored MPPT control algorithm.

FIG. 3A is a view illustrating a P-V curve of a solar panel that changes according to a temperature of a solar panel when the amount of insolation incident on the solar panel of FIG. 2 is 1 kW/m², and FIG. 3B is a view illustrating a P-V curve of a solar panel that changes according to the amount of insolation incident on the solar panel when the temperature of the panel is 25° C.

In FIGS. 3A and 3B, the x-axis represents an output voltage of the solar panel and an input voltage of the boost converter, and the y-axis represents DC power generated by the solar panel. As shown in FIGS. 3A and 3B, the DC power generated by the solar panel changes according to a temperature of the solar panel and the amount of insolation incident on the solar panel, and the MPPT controller controls the boost converter so that the input voltage $V_{PV}$ of the boost converter is equal to a voltage corresponding to a maximum power point of the P-V curve. When the input voltage $V_{PV}$ of the boost converter is equal to the voltage corresponding to the maximum power point of the P-V curve of the solar panel as a result of the MPPT control of the boost converter by the MPPT controller, the maximum power may be generated in the solar panel.

The MPPT controller may alternately turn the switch $SW_2$ on and off according to a duty ratio by the MPPT control algorithm. When the MPPT controller turns the switch $SW_2$ on, the input current $I_{PV}$ based on the input voltage $V_{PV}$ of the boost converter flows through the path □ of FIG. 2 and electrical energy is stored in the inductor $L_2$. Thereafter, when the MPPT controller turns the switch $SW_2$ off, the electrical energy stored in the inductor $L_2$ and the electrical energy based on the input current $I_{PV}$ are stored in the link capacitor $C_2$ through the path □ in FIG. 2. That is, DC power-based electrical energy output from the solar panel is stored in the link capacitor $C_{L2}$.

A load $R_2$ is provided with DC power-based electrical energy stored in the link capacitor $C_2$. FIG. 2 shows that the load $R_2$ includes a resistance component, but the load $R_2$ may be a battery mounted in an electric vehicle, instead of the resistance component. In this case, the battery mounted in the electric vehicle is charged by the DC power-based electric energy stored in the link capacitor $C_2$.

RELATED ART DOCUMENT

Patent Document (Patent document 1) Korean Patent Registration No. 10-2034431 (published on Oct. 11, 2019)

SUMMARY

As described above, the load may be provided with AC power-based electrical energy or DC power-based electrical energy. An exemplary embodiment of the present invention is directed to providing an integrated DC/DC and AC/DC converter system capable of selectively providing AC power-based electrical energy output from an AC power supply unit and DC power-based electrical energy outputted from a DC power supply unit to a load.

An exemplary embodiment of the present invention is directed to providing an integrated type DC/DC and AC/DC converter system capable of reducing the number of elements, compared to a case of simply combining the system providing AC power-based electrical energy to a load and the system providing DC power-based electrical energy to a load.

In one general aspect, an integrated DC/DC and AC/DC converter system includes: a first inductor having one end connected to an AC power supply unit; a second inductor having one end connected to a DC power supply unit; a first switch having one end connected to the other end of the first inductor and the other end of the second inductor; a second switch having one end connected to the other end of the first inductor, the other end of the second inductor, and one end of the first switch; a main relay having one end connected to the other end of the first switch and the other end of the second switch and the other end selectively connected to any one of the AC power supply unit and the DC power supply unit; and a controller controlling a switching operation of the first switch, the second switch, and the main relay to provide, to a load, the AC power-based electrical energy output from the AC power supply unit or the DC power-based electrical energy output from the DC power supply unit.

The controller may connect the other end of the main relay to the AC power supply unit and alternately turn the first switch and the second switch on or off so that the AC power-based electrical energy output from the AC power supply unit is provided to the load.

The controller may connect the other end of the main relay to the DC power supply unit and alternately turn the first switch and the second switch on or off so that the DC power-based electrical energy output from the DC power supply unit is provided to the load. Here, the controller may control a duty ratio of the first switch and the second switch so that DC power generated by the DC power supply unit is maximized according to a temperature of the DC power supply unit and an amount of insolation incident on the DC power supply unit.

The integrated DC/DC and AC/DC converter system may further include: a first diode including an anode electrode connected to one end of the main relay and a cathode electrode connected to the other end of the first switch; and a second diode including an anode electrode connected to the other end of the second switch and a cathode electrode connected to one end of the main relay.

The integrated DC/DC and AC/DC converter system may further include: a third switch having one end connected to one end of the main relay and the other end connected to the other end of the first switch; and a fourth switch having one end connected to the other end of the second switch and the other end connected to one end of the main relay, wherein an anode electrode of a body diode of the third switch may be connected to one end of the main relay and a cathode electrode of the body diode of the third switch may be connected to the other end of the first switch, and an anode electrode of a body diode of the fourth switch may be connected to the other end of the second switch and a cathode electrode of the body diode of the fourth switch may be connected to one end of the main relay.

The first inductor and the second inductor may share the same core and may be magnetically coupled to each other.

The integrated DC/DC and AC/DC converter system may further include: a link capacitor having one end connected to the other end of the first switch and the other end connected to the other end of the second switch, and storing the AC power-based electrical energy output from the AC power supply unit or the DC power-based electrical energy output from the DC power supply unit according to the switching operation controlled by the controller, wherein the load is provided with electrical energy stored in the link capacitor.

The integrated DC/DC and AC/DC converter system may further include: an inverter converting a link voltage of an electrical energy stored in the link capacitor into an AC voltage; a transformer transforming the AC voltage converted by the inverter, and a DC-DC converter unit converting the AC voltage transformed by the transformer into a DC voltage and providing the DC voltage to the load.

The integrated DC/DC and AC/DC converter system may further include: a first sub-relay having one end connected to one end of the link capacitor and the other end selectively connected to any one of the inverter and one end of the bypass path; and a second sub-relay having one end connected to one end of the load and the other end selectively connected to any one of the rectifier and the other end of the bypass path, wherein when the controller connects the other end of the main relay to the AC power supply unit, the controller connects the other end of the first sub-relay to the inverter and connects the other end of the second sub-relay to the rectifier, so that the electrical energy is provided to the load in a state in which the link voltage of the electrical energy stored in the link capacitor is converted by the DC-DC converter unit, and when the controller connects the other end of the main relay to the DC power supply unit, the controller connects the other end of the first sub-relay to one end of the bypass path and connects the other end of the second sub-relay to the other end of the bypass path, so that the electrical energy is provided to the load in a state in which the link voltage of the electrical energy stored in the link capacitor is not converted by the DC-DC converter unit. The main relay, the first sub-relay, and the second sub-relay may be implemented as a 3-pole double-through (3PDT) relay.

The integrated DC/DC and AC/DC converter system may further include: a first sub-relay having one end connected to one end of the link capacitor and the other end selectively connected to any one of the inverter and one end of the bypass path; a second sub-relay having one end connected to one end of the load and the other end selectively connected to any one of the rectifier and the other end of the bypass path; and a third sub-relay having one end connected to the other end of the link capacitor and the other end selectively connected to any one of the inverter and the other end of the load, wherein the other end is connected to a first ground, the other end of the load is connected to a second ground located at a point different from the first ground, and when the controller connects the other end of the main relay to the AC power supply unit, the controller connects the other end of the first sub-relay to the inverter, connects the other end of the second sub-relay to the rectifier, and connects the other end of the third sub-relay to the inverter, so that the electrical energy is provided to the load in a state in which the link voltage of the electrical energy stored in the link capacitor is converted by the DC-DC converter unit, and when the controller connects the other end of the main relay to the DC power supply unit, the controller connects the other end of the first sub-relay to one end of the bypass path, connects the other end of the second sub-relay to the other end of the bypass path, and connects the other end of the third sub-relay to the other end of the load, so that the electrical energy is provided to the load in a state in which the link voltage of the electrical energy stored in the link capacitor is not converted by the DC-DC converter unit. The main relay, the first sub-relay, the second sub-relay, and the third sub-relay may be implemented as a 4-pole double-through (4PDT) relay.

The integrated DC/DC and AC/DC converter system may further include: an auxiliary load provided with the DC power-based electrical energy output from the DC power supply unit according to the switching operation controlled by the controller.

The integrated DC/DC and AC/DC converter system may further include: a first sub-relay having one end connected to one end of the link capacitor and the other end selectively connected to any one of the inverter and one end of the bypass path; a fourth sub-relay having one end connected to one end of the load and the other end connected to or disconnected from the rectifier; and a fifth sub-relay having one end connected to one end of the auxiliary load and the other end connected to or disconnected from the other end of the bypass path, wherein when the controller connects the other end of the main relay to the AC power supply unit, the controller connects the other end of the first sub-relay to the inverter, connects the other end of the fourth sub-relay to the rectifier, and disconnects the other end of the fifth sub-relay from the other end of the bypass path, so that the electrical energy is provided to the load in a state in which the link voltage of the electrical energy stored in the link capacitor is converted by the DC-DC converter unit, and when the controller connects the other end of the main relay to the DC power supply unit, the controller connects the other end of the first sub-relay to one end of the bypass path, connects the other end of the second sub-relay to the other end of the bypass path, disconnects the other end of the fourth sub-relay from the rectifier, and connects the other end of the fifth sub-relay to the other end of the bypass path, so that the electrical energy is provided to the auxiliary load in a state in which the link voltage of the electrical energy stored in the link capacitor is not converted by the DC-DC converter unit. Here, the main relay, the first sub-relay, the fourth sub-relay, and the fifth sub-relay may be implemented as a 4-pole double-through (4PDT) relay.

Other features and aspects will be apparent from the following detailed description, the drawings, and the claims.

BRIEF DESCRIPTION OF THE DRAWINGS

FIG. 7A is a view illustrating a current path formed when a controller connects the other end of a main relay to a DC power supply unit, turns a first switch off, and turns a second switch on.

DETAILED DESCRIPTION OF EXEMPLARY EMBODIMENTS

Hereinafter, an integrated DC/DC and AC/DC converter system according to the present invention will be described in detail with reference to the accompanying drawings. The accompanying drawings are provided by way of example only so that the technical idea of the present invention may be sufficiently conveyed to those skilled in the art, and the present invention is not limited to the drawings presented below and may be embodied in other forms. In addition, the term "unit" refers to a unit for processing one function or operation, which may be implemented as hardware or software, or a combination of hardware and software.

Figure 4:
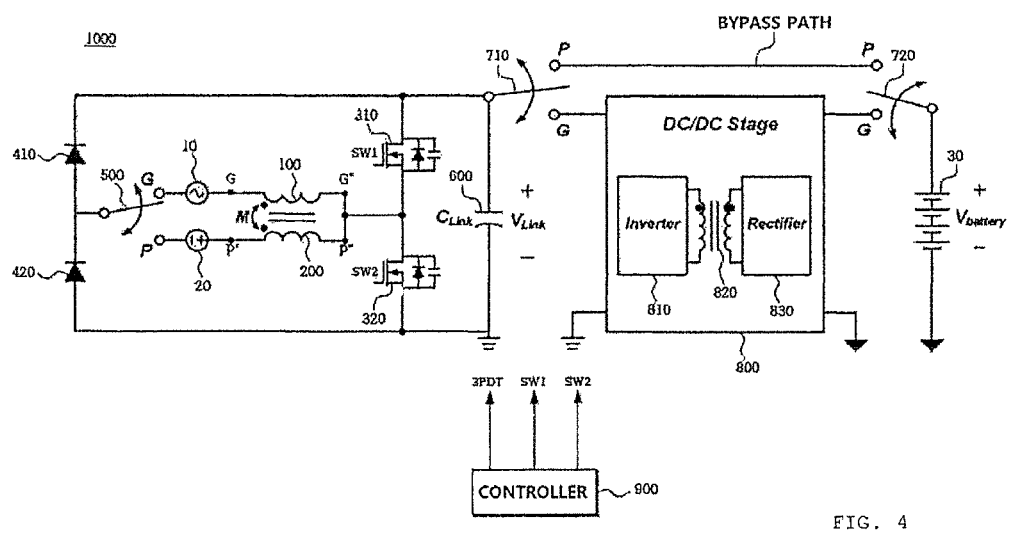
FIG. 4 is a view illustrating an integrated DC/DC and AC/DC converter system according to a first exemplary embodiment of the present invention.

FIG. 4 is a view illustrating an integrated DC/DC and AC/DC converter system according to a first exemplary embodiment of the present invention.

As shown in FIG. 4, an integrated DC/DC and AC/DC converter system 1000 according to a first exemplary embodiment of the present invention includes a first inductor 100, a second inductor 200, a first switch 310, a second switch 320, a main relay 500, and a controller 900.

One end of the first inductor 100 is connected to an AC power supply unit 10, and the other end thereof is connected to one end of the first switch 310 and one end of the second switch 320. The AC power supply unit 10 serves to output AC power. For example, when the system 1000 according to the present invention is provided in an electric vehicle, the AC power supply unit 10 may correspond to a grid that supplies AC power from a power supplier. The first inductor 100 compensates for a power factor of the AC power supplied from the AC power supply unit 10, and converts the AC power into DC power so that DC power having an appropriate magnitude may be provided to a link capacitor 600 and a load 30, which will be described later.

One end of the second inductor 200 may be connected to the DC power supply unit 20, and the other end thereof is connected to one end of the first switch 310 and one end of the second switch 320. The DC power supply unit 20 serves to output DC power. For example, when the system 1000 according to the present invention is provided in an electric vehicle, the DC power supply unit 20 may correspond to a solar panel located on a roof of the electric vehicle. The second inductor 200 is provided to convert the DC voltage of the DC power so that the DC power generated by the DC power supply unit 20 is a maximized value according to a temperature of the DC power supply unit 20 and the amount of insolation incident on the DC power supply unit 20.

The first switch 310 has one end connected to the other end of the first inductor 100 and the other end of the second inductor 200. The second switch 320 has one end connected to the other end of the first inductor 100, the other end of the second inductor 200, and one end of the first switch 310. A metal oxide semiconductor field effect transistor (MOSFET) may be used as the first switch 310 and the second switch 320.

One end of the main relay 500 is connected to the other end of the first switch 310 and the other end of the second switch 320, and the other end of the main relay 500 is selectively connected to any one of the AC power supply unit 10 and the DC power supply unit 20.

The controller 900 controls a switching operation of the first switch 310, the second switch 320, and the main relay 500 to provide electrical energy based on the AC power output from the AC power supply unit 10 or electrical energy based on the DC power output from the DC power supply unit 20 to the load 30. For example, when the system 1000 according to the present invention is provided in an electric vehicle, the load 30 may be a battery mounted in the electric vehicle.

The controller 900 may connect the other end of the main relay 500 to the AC power supply unit 10. A case that the controller 900 connects the other end of the main relay 500 to the AC power supply unit 10 may correspond to a case that the integrated DC/DC and AC/DC converter system 1000 provided in an electrical vehicle is provided with AC power from a grid (i.e., the AC power supply unit 10).

When the controller 900 connects the other end of the main relay 500 to the AC power supply unit 10, the controller 900 alternately turns the first switch 310 on/off and the second switch 320 so that the AC power-based electrical energy output from the AC power supply unit 10 is provided to the load 30. That is, when the controller 900 turns the first switch 310 on, the controller 900 turns the second switch 320 off, and when the controller turns the first switch 310 off, the controller 900 turns the second switch 320 on.

Figure 5A:
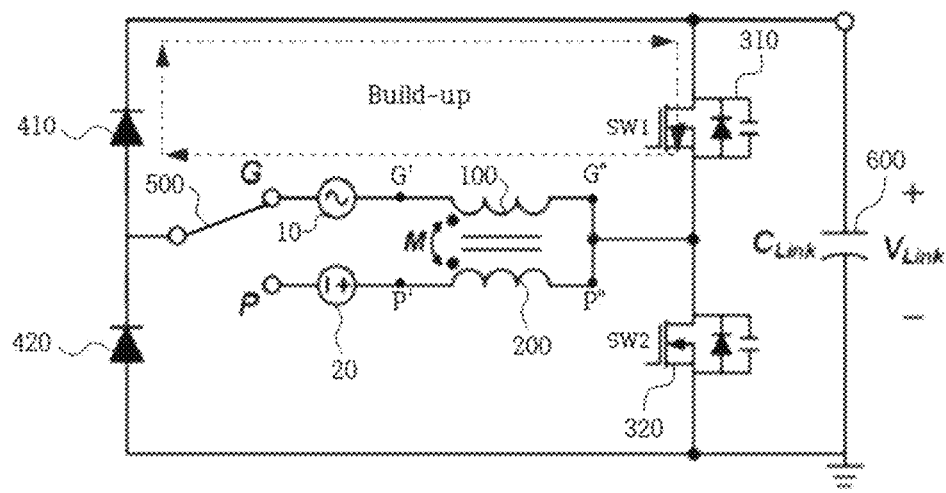
FIG. 5A is a view illustrating a current path formed when a controller turns a first switch on and turns a second switch off during a time interval in which a positive (+) voltage is output from an AC power supply unit in case that a controller connects the other end of a main relay to the AC power supply unit.

In a time period during which a positive voltage is output from the AC power supply unit 10, the controller 900 may turn the first switch 310 on and turn the second switch 320 off. In this case, a current path of a build-up mode as shown in FIG. 5A is formed and electrical energy is stored in the first inductor 100. Thereafter, the controller 900 may turn the first switch 310 off and turn the second switch 320 on. In this case, a current path of a powering mode as shown in FIG. 5B is formed and the electrical energy stored in the first inductor 100 and the electrical energy according to a current output from the AC power supply unit 10 are provided to the link capacitor 600 and the load 30.

Figure 5B:
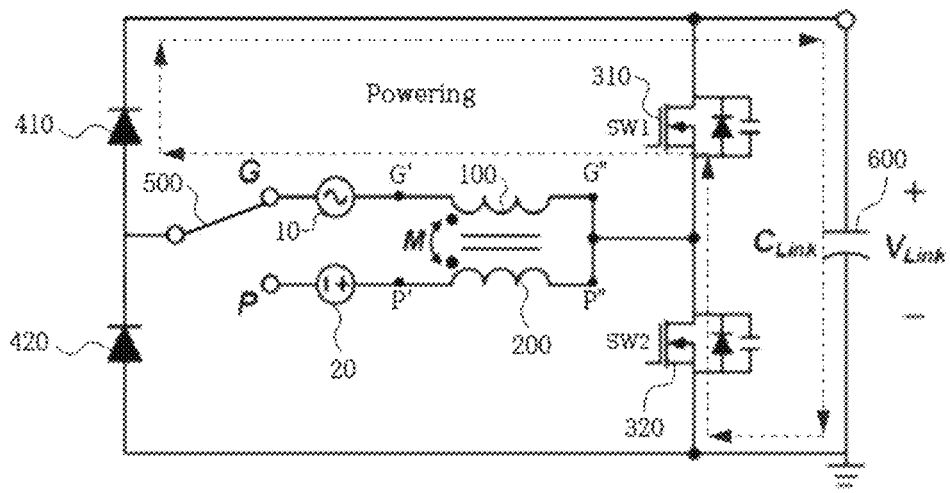
FIG. 5B is a view illustrating a current path formed when a controller turns a first switch off and turns a second switch on during a time interval in which a positive (+) voltage is output from an AC power supply unit in case that a controller connects the other end of a main relay to the AC power supply unit.

As shown in FIGS. 5A and 5B, in the time period during which the positive voltage is output from the AC power supply unit 10, a current flows from one end of the main relay 500 to the other end of the first switch 310. Here, in order to prevent a reverse current from flowing from the other end of the first switch 310 to one end of the main relay 500, a first diode 410 including an anode electrode connected to one end of the main relay 500 and a cathode electrode connected to the other end of the first switch 310 may be provided.

Figure 6A:
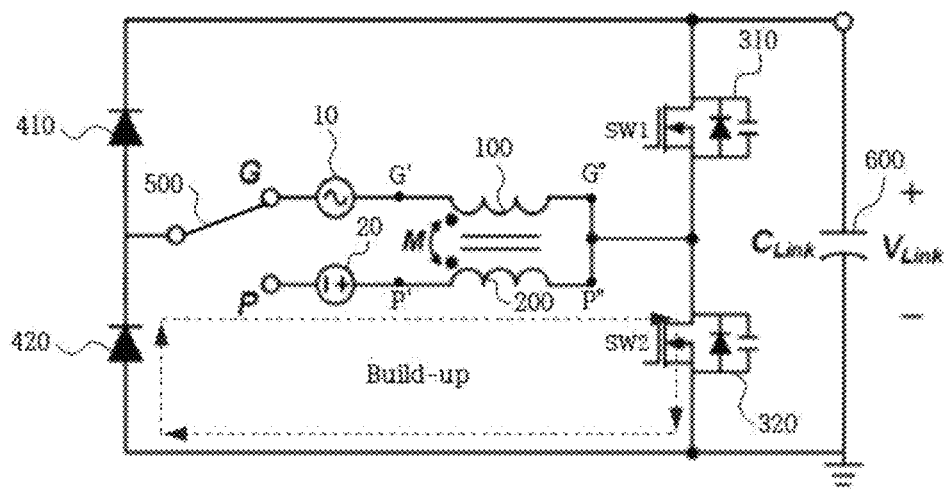
FIG. 6A is a view illustrating a current path formed when a controller turns a first switch off and turns a second switch on during a time interval in which a negative (−) voltage is output from an AC power supply unit in case that a controller connects the other end of a main relay to the AC power supply unit.

In a time period during which a negative voltage is output from the AC power supply unit 10, the controller 900 may turn the first switch 310 off and turn the second switch 320 on. In this case, a current path of a build-up mode as shown in FIG. 6A is formed and electrical energy is stored in the first inductor 100. Thereafter, the controller 900 may turn the first switch 310 on and turn the second switch 320 off. In this case, while a current path of a powering mode as shown in FIG. 6B is formed and the electrical energy stored in the first inductor 100 and the electrical energy according to a current output from the AC power supply unit 10 are transferred to the link capacitor 600 and the load 30.

Figure 6B:
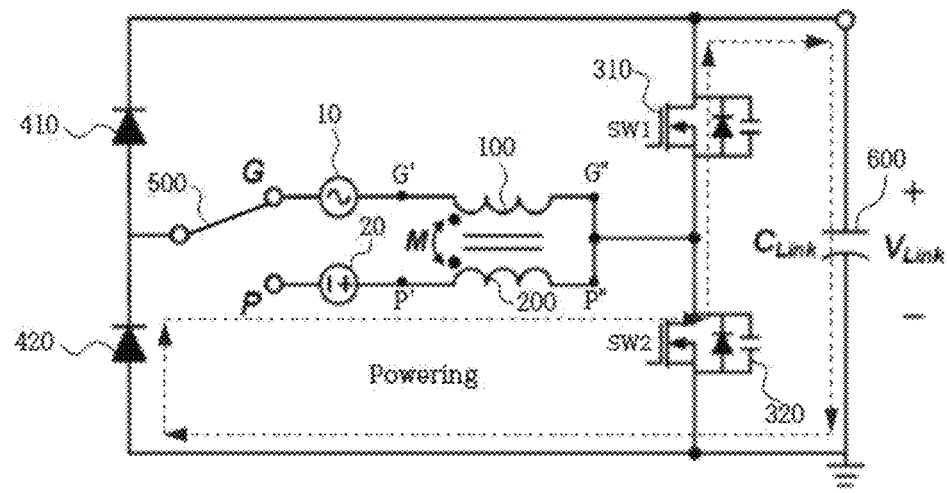
FIG. 6B is a view illustrating a current path formed when a controller turns a first switch on and turns a second switch off during a time interval in which a negative (−) voltage is output from an AC power supply unit in case that a controller connects the other end of a main relay to the AC power supply unit.

As shown in FIGS. 6A and 6B, in the time period during which the negative voltage is output from the AC power supply unit 10, a current flows from the other end of the second switch 320 to one end of the main relay 500. Here, in order to prevent a reverse current from flowing from one end of the main relay 500 to the other end of the second switch 320, a second diode 420 including an anode electrode connected to the other end of the second switch 320 and a cathode electrode connected to one end of the main relay 500 may be provided.

Meanwhile, the controller 900 may connect the other end of the main relay 500 to the DC power supply unit 20. A case that the controller 900 connects the other end of the main relay 500 to the DC power supply unit 20 may correspond to a case that the integrated DC/DC and AC/DC converter system 1000 provided in the electric vehicle is provided with DC power from a solar panel (i.e., the DC power supply unit 20) provided in a roof of the electric vehicle. That is, when the integrated DC/DC and AC/DC converter system 1000 provided in the electric vehicle is supplied with AC power from the grid (i.e., the AC power supply unit 10), the controller 900 may connect the other end of the main relay 500 to the AC power supply unit 10, and may connect the other end of the main relay 500 to the DC power supply unit 20 in other cases.

When the controller 900 connects the other end of the main relay 500 to the DC power supply unit 20, the controller 900 alternately turns the first switch 310 and the second switch 320 on/off, so that the DC power-based electrical energy output from the DC power supply unit 20 is provided to the load 30. That is, when the controller 900 turns the first switch 310 on, the controller 900 turns the second switch 320 off, and when the controller 900 turns the first switch 310 off, the controller 900 turns the second switch 320 on.

When the DC power supply unit 20 is a solar panel, the DC power generated by the DC power supply unit 20 is changed according to a temperature of the DC power supply unit 20 and the amount of insolation incident on the DC power supply unit 20. The controller 900 obtains an output voltage of the DC power supply unit 20 and an output current of the DC power supply unit 20 to calculate power of the DC power supply unit 20, and changes the output voltage of the DC power supply unit 20 so that maximum power may be generated by the DC power supply unit 20 according to an MPPT control algorithm stored in advance. In this case, the MPPT control algorithm for implementing a perturb and observe (P&O) method, an incremental conductance (InCond) method, and the like may be previously stored in the controller 900.

The controller 900 may control duty ratios of the first switch 310 and the second switch 320 by the previously stored MPPT control algorithm so that the DC power generated by the DC power supply unit 20 is maximized according to a temperature of the DC power supply unit 20 and the amount of insolation incident on the DC power supply unit 20.

Figure 7A:
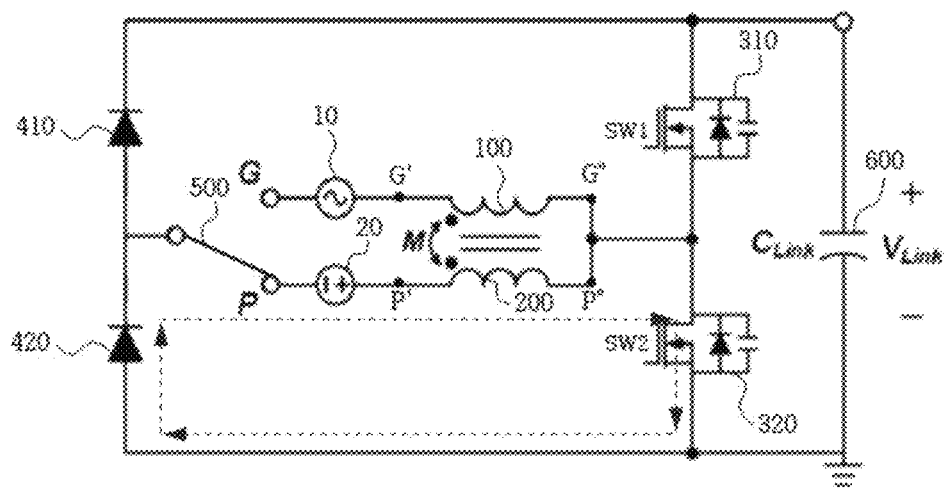
Figure 7B:
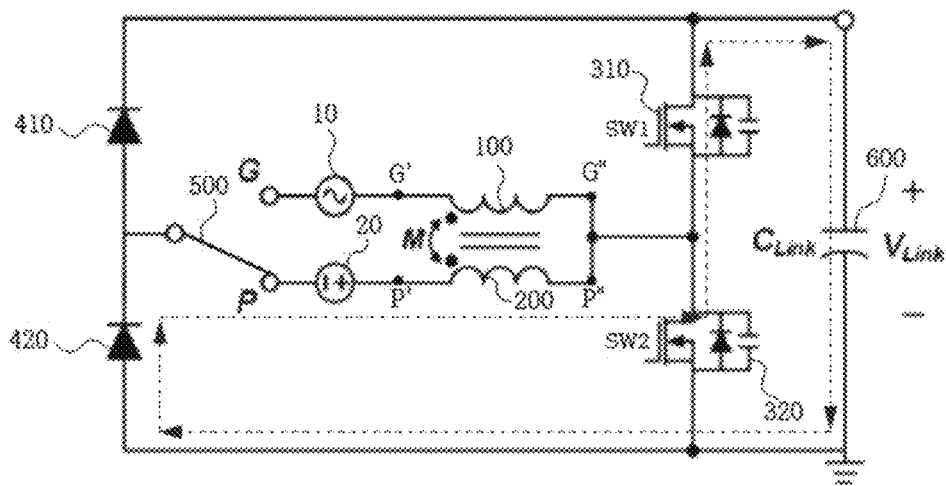
FIG. 7B is a view illustrating a current path formed when the controller connects the other end of the main relay to the DC power supply, turns a first switch on, and turns a second switch off.

When the first switch 310 is turned off and the second switch 320 is turned on according to the duty ratio controlled by the controller 900, a current path as shown in FIG. 7A is formed and electrical energy is stored in the second inductor 200. Thereafter, when the first switch 310 is turned on and the second switch 320 is turned off according to the duty ratio controlled by the controller 900, a current path as shown in FIG. 7B is formed and the electrical energy stored in the second inductor 200 and electrical energy according to the current output from the DC power supply unit 20 are provided to the link capacitor 600 and the load 30.

When the controller 900 connects the other end of the main relay 500 to the DC power supply unit 20 so that the DC power-based electrical energy output from the DC power supply unit 20 is provided to the load 30, a current flows from the other end of the second switch 320 toward one end of the main relay 500. Here, since the second diode 420 is provided between the other end of the second switch 320 and one end of the main relay 500, a reverse current from one end of the main relay 500 to the other end of the second switch 320 may be prevented.

Figure 1:
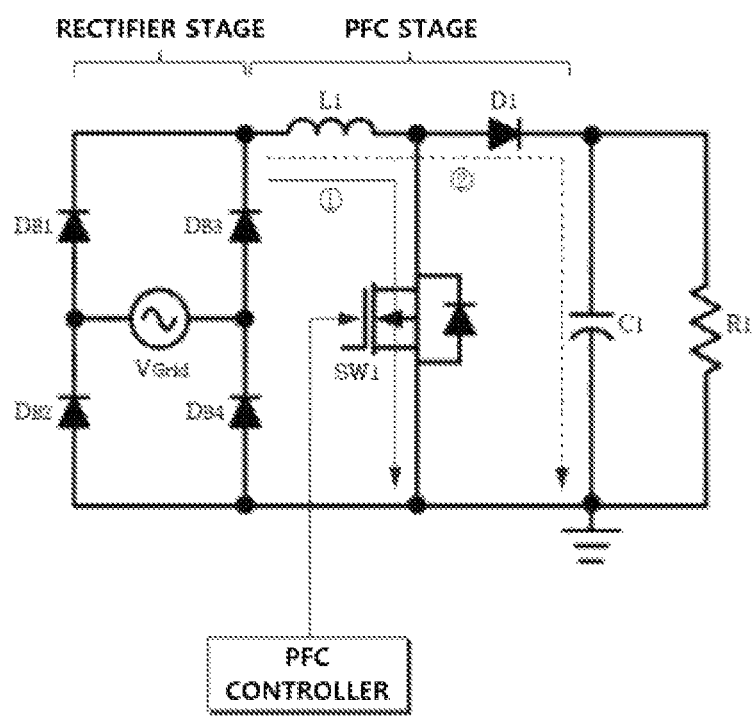
FIG. 1 is a view illustrating a rectifier stage and a PFC stage of the related art on-board charger (OBC).
Figure 2:
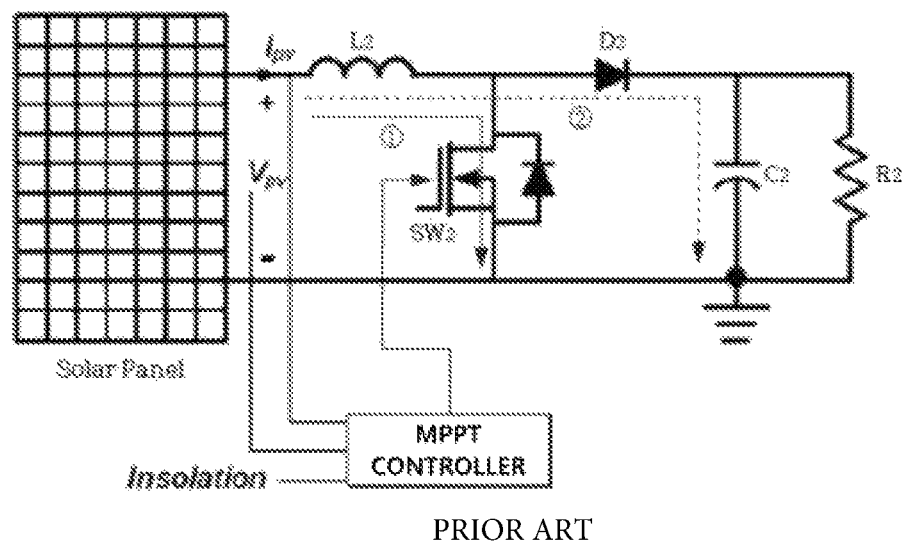
FIG. 2 is a view illustrating a solar power generation system of the related art.
Figure 3A:
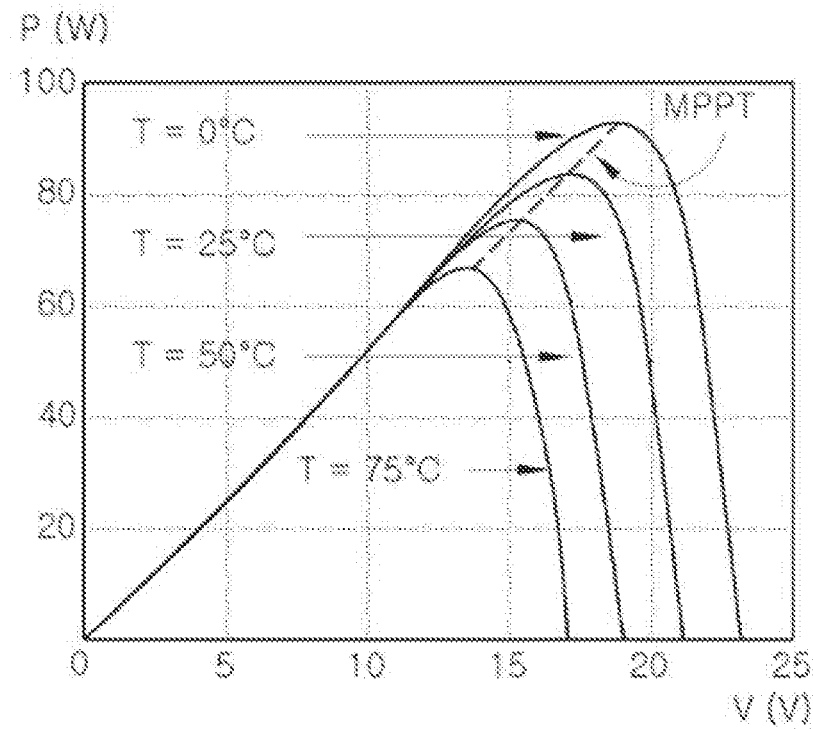
FIG. 3A is a view illustrating a P-V curve of a solar panel that changes according to a temperature of a solar panel when the amount of insolation incident on the solar panel of FIG. 2 is 1 kW/m$^2$.
Figure 3B:
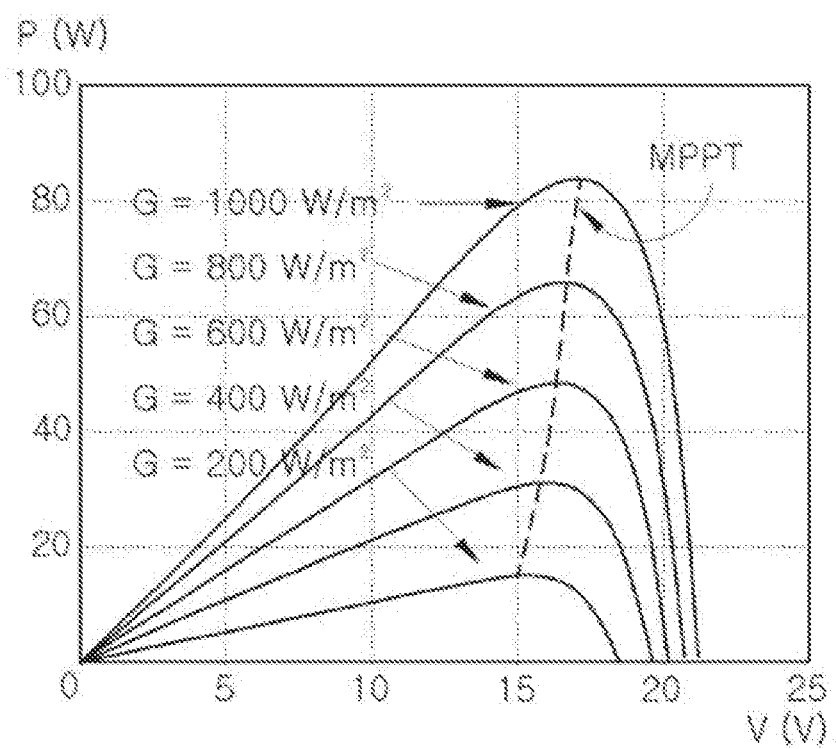
FIG. 3B is a view illustrating a P-V curve of a solar panel that changes according to the amount of insolation incident on the solar panel when a temperature of the solar panel of FIG. 2 is 25° C.

As such, the present invention provides a method of integrating the boost PFC converter used in the related art OBC shown in FIG. 1 and the boost converter used in the related art solar power generation system shown in FIG. 2 into one boost converter. According to the present invention, the number of elements may be reduced compared to the case of simply combining a system for providing electrical energy based on AC power to a load and a system for providing electrical energy based on DC power to a load in the related art, and thus, a volume of the system may be reduced and costs thereof may be reduced. In addition, since the number of diodes is reduced, conduction loss due to a diode may be reduced, and the number of switches may also be reduced to reduce conduction loss and switching loss by the switch, thereby improving efficiency of providing electrical energy to the load.

Meanwhile, the first inductor 100 serves to temporarily store the AC power-based electrical energy output from the AC power supply unit 10, and the second inductor 200 serves to temporarily store the DC power-based electrical energy output from the DC power supply unit 20. Accordingly, inductance of the first inductor 100 and inductance of the second inductor 200 may be different from each other.

The first inductor 100 and the second inductor 200 may each be formed of separate inductor elements, but as shown in FIG. 4, the first inductor 100 and the second inductor 200 may be magnetically coupled to each other and share the same core. That is, the first inductor 100 and the second inductor 200 may be formed of coupling inductors having a mutual inductance M. The fact that the first inductor 100 and the second inductor 200 are magnetically coupled to each other means that the first inductor 100 and the second inductor 200 share the same core and are mutually inductively coupled by the number of coils wound around the core.

Figure 8:
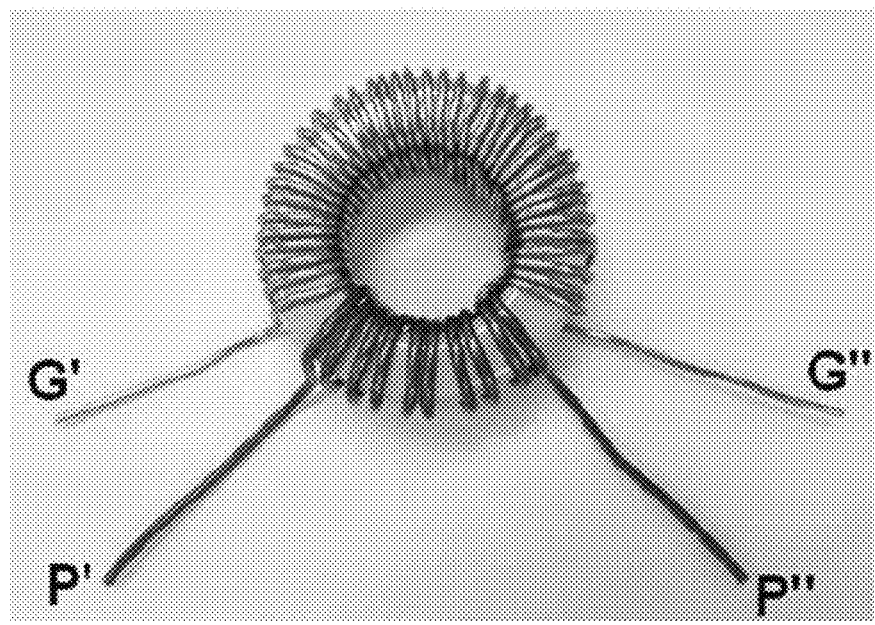
FIG. 8 is a view illustrating a state in which two wires are spatially separated and wound around one core.

Specifically, as shown in FIG. 8, after two wires are wound around one core spatially separately, a G'-G" winding portion thereof may be used as the first inductor 100 and a P'-P" winding portion may be used as the second inductor 200. As described above, when the first inductor 100 and the second inductor 200 share the same core and are magnetically coupled to each other, a volume of the system 1000 may be reduced and costs thereof may be reduced, as compared with a case that the first inductor 100 and the second inductor 200 are configured as separate inductor elements.

The integrated DC/DC and AC/DC converter system 1000 according to an exemplary embodiment of the present invention may include a link capacitor 600. One end of the link capacitor 600 may be connected to the other end of the first switch 310, and the other end of the link capacitor 600 may be connected to the other end of the second switch 320. The link capacitor 600 corresponds to a temporary storage space of electrical energy. That is, according to a switching operation controlled by the controller 900 for the first switch 310, the second switch 320, and the main relay 500, the AC power-based electrical energy output from the AC power supply unit 10 or the DC power-based electrical energy output from the DC power supply unit 20 may be temporarily stored in the link capacitor 600.

The load 30 is provided with electrical energy stored in the link capacitor 600. However, in case the load 30 needs to be provided with electrical energy having a DC voltage having a specific magnitude, a DC-DC converter unit 800 that converts a link voltage of the electrical energy stored in the link capacitor 600 into a DC voltage having an appropriate magnitude may need to be provided.

The DC-DC converter unit 800 includes an inverter 810 that converts the link voltage of electrical energy stored in the link capacitor 600 into an AC voltage, a transformer 820 that transforms the AC voltage converted by the inverter 810, and a rectifier 830 that converts the AC voltage transformed by the transformer 820 into a DC voltage and provides the DC voltage to the load 30.

The inverter 810 of the DC-DC converter unit 800 may be directly connected to the link capacitor 600. In this case, the DC-DC converter unit 800 converts AC power-based electrical energy stored in the link capacitor 600 or DC power-based electrical energy into a DC voltage having an appropriate magnitude and provides the DC voltage to the load 30. In particular, when the load 30 is a battery having a rated charging voltage, the DC-DC converter unit 800 may convert the link voltage of electrical energy stored in the link capacitor 600 into a rated charging voltage to stably charge the battery.

Alternatively, the inverter 810 of the DC-DC converter unit 800 may be selectively connected to the link capacitor 600 through a first sub-relay 710 to be described later. In this case, the DC-DC converter unit 800 converts only AC power-based electrical energy stored in the link capacitor 600 into a DC voltage having an appropriate magnitude and provides the DC voltage to the load 30.

That is, the voltage of AC power supplied from the grid (i.e., the AC power supply unit 10) may be provided to the load 30 after undergoing a voltage conversion process by the DC-DC converter unit 800. In contrast, since the voltage of the DC power supplied from the solar panel (i.e., the DC power supply unit 20) is lower than the voltage of the AC power supplied from the grid (i.e., the AC power supply unit 10), the voltage of the DC power may be provided to the auxiliary load 40 to be described later without undergoing the voltage conversion process by the DC-DC converter unit 800.

The integrated DC/DC and AC/DC converter system 1000 according to the first exemplary embodiment of the present invention may further include a first sub-relay 710 and a second sub-relay 720.

One end of the first sub-relay 710 is connected to one end of the link capacitor 600, and the other end of the first sub-relay 710 is selectively connected to any one of the inverter 810 and one end of the bypass path. One end of the second sub-relay 720 is connected to one end of the load 30, and the other end of the second sub-relay 720 is selectively connected to any one of the rectifier 830 and the other end of the bypass path.

When the controller 900 connects the other end of the main relay 500 to the AC power supply unit 10, the controller 900 connects the other end of the first sub-relay 710 to the inverter 810 and connects the other end of the second sub-relay 720 to the rectifier 830. As the controller 900 operates in this manner, the AC power-based electrical energy is provided to the load 30 in a state in which the electrical energy (which is AC power-based electrical energy) stored in the link capacitor 600 is converted by the DC-DC converter unit 800.

In contrast, when the controller 900 connects the other end of the main relay 500 to the DC power supply unit 20, the controller 900 may connect the other end of the first sub-relay 710 to one end of the bypass path and connect the other end of the second sub-relay 720 to the other end of the bypass path. As the controller 900 operates in this manner, the DC power-based electrical energy is provided to the load 30 in a state in which electrical energy stored in the link capacitor 600 (which is DC power-based electrical energy) is not converted by the DC-DC converter unit 800.

The main relay 500, the first sub-relay 710, and the second sub-relay 720 may be implemented as separate relays, respectively. Alternatively, the main relay 500, the first sub-relay 710, and the second sub-relay 720 may be implemented as a 3-pole double-throw (3PDT) relay.

Figure 9:
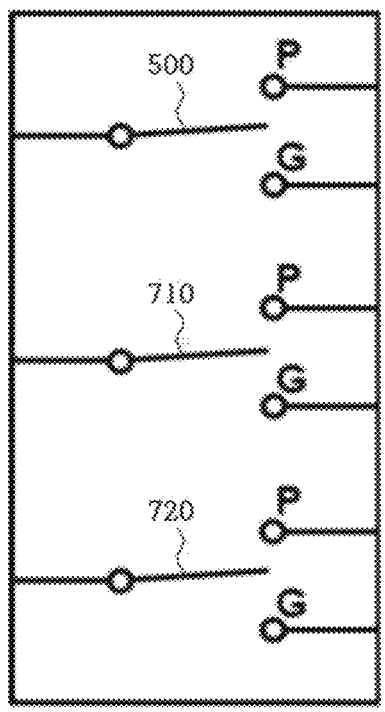
FIG. 9 is a diagram schematically illustrating a state in which a main relay, a first sub-relay, and a second sub-relay are implemented as a 3PDT relay.

FIG. 9 is a diagram schematically illustrating a configuration in which the main relay 500, the first sub-relay 710, and the second sub-relay 720 are implemented as a 3PDT relay. As shown in FIG. 9, when the main relay 500, the first sub-relay 710, and the second sub-relay 720 are implemented as a 3PDT relay, once the controller 900 transmits a single switching operation control signal to the 3PDT relay, the main relay 500, the first sub-relay 710, and the second sub-relay 720 are collectively connected to contacts G and AC power-based electrical energy output from the AC power supply unit 10 is provided to the load 30. Also, once the controller 900 transmits another switching operation control signal to the 3PDT relay, the main relay 500, the first sub-relay 710, and the second sub-relay 720 are collectively connected to the contacts P, and the DC power-based electrical energy output from the DC power supply unit 20 is provided to the load 30.

In this manner, when the main relay 500, the first sub-relay 710, and the second sub-relay 720 are implemented as a 3PDT relay, a volume of the system 1000 may be reduced and costs thereof may be reduced, as compared with a case that the main relay 500, the first sub-relay 710, and the second sub-relay 720 are implemented as separate relays.

Figure 10:
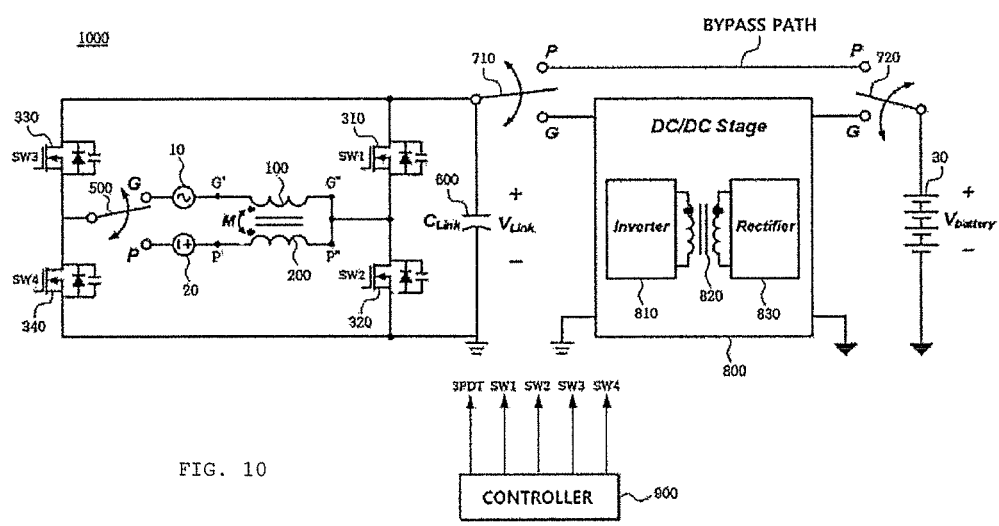
FIG. 10 is a view illustrating an integrated DC/DC and AC/DC converter system according to a second exemplary embodiment of the present invention.

FIG. 10 is a view illustrating an integrated DC/DC and AC/DC converter system according to a second exemplary embodiment of the present invention.

As shown in FIG. 10, in the system according to the second exemplary embodiment of the present invention, a third switch 330 instead of the first diode 410 is used and a fourth switch 340 instead of the second diode 420 is used, compared to the system according to the first exemplary embodiment of the present invention. Accordingly, in the following, only a portion different from the system according to the first exemplary embodiment of the present invention will be described.

Like the first switch 310 and the second switch 320, the third switch 330 and the fourth switch 340 may also be MOSFETs.

The controller 900 may turn the third switch 330 on when a current needs to flow from one end of the main relay 500 to the other end of the first switch 310, and the controller 900 may turn the third switch 330 off when a current should not flow from one end of the main relay 500 toward the other end of the first switch 310.

In addition, the controller 900 may turn the fourth switch 340 on when a current needs to flow from the other end of the second switch 320 to one end of the main relay 500, and the controller 900 may turn the fourth switch 340 off when a current should not flow from the other end of the second switch 320 to one end of the main relay 500.

An anode electrode of a body diode of the third switch 330 is connected to one end of the main relay 500, and a cathode electrode of the body diode of the third switch 330 is connected to the other end of the first switch 310. The body diode of the third switch 330 serves to prevent a reverse current from flowing from the other end of the first switch 310 to one end of the main relay 500.

An anode electrode of a body diode of the fourth switch 340 is connected to the other end of the second switch 320, and a cathode electrode of the body diode of the fourth switch 340 is connected to one end of the main relay 500. The body diode of the fourth switch 340 serves to prevent a reverse current from flowing from one end of the main relay 500 to the other end of the second switch 320.

When the third switch 330 and the fourth switch 340 are provided in the integrated DC/DC and AC/DC converter system 1000 according to the present invention, a reverse current may be prevented from flowing as described above. In addition, when the current should not flow from one end of the main relay 500 to the other end of the first switch 310, the controller 900 turns the third switch 330 off to reliably cut off a current path from one end of the main relay 500 to the other end of the first switch 310. Similarly, when a current should not flow from the other end of the second switch 320 to one end of the main relay 500, the controller 900 turns the fourth switch 340 off to reliably cut off a current path from the other end to one end of the second switch 320 to one end of the main relay 500.

Figure 11:
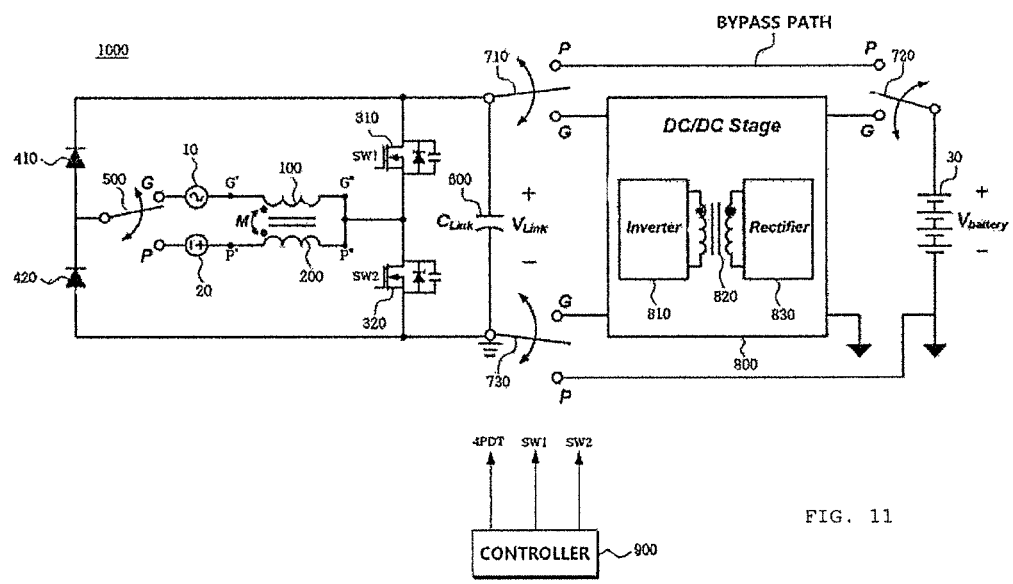
FIG. 11 is a view illustrating an integrated DC/DC and AC/DC converter system according to a third exemplary embodiment of the present invention.

FIG. 11 is a diagram illustrating an integrated DC/DC and AC/DC converter system according to a third exemplary embodiment of the present invention.

As shown in FIG. 11, the system according to the third exemplary embodiment of the present invention further includes a third sub-relay 730 in addition to the first sub-relay 710 and the second sub-relay 720, compared with the system according to the first exemplary embodiment of the present invention.

That is, as described above, one end of the first sub-relay 710 is connected to one end of the link capacitor 600, and the other end of the first sub-relay 710 is selectively connected to any one of the inverter 810 and one end of the bypass path. One end of the second sub-relay 720 is connected to one end of the load 30, and the other end of the second sub-relay 720 is selectively connected to any one of the rectifier 830 and the other end of the bypass path. Hereinafter, only a portion different from the system according to the first exemplary embodiment of the present invention will be described.

In the integrated DC/DC and AC/DC converter system 1000 according to the third exemplary embodiment of the present invention, one end of the third sub-relay 730 is connected to the other end of the link capacitor 600, and the other end of the third sub-relay 730 is selectively connected to any one of the inverter 810 of the DC-DC converter unit 800 and the other end of the load 30. Here, the other end of the link capacitor 600 is connected to a first ground, and the other end of the load 30 is connected to a second ground located at a point different from the first ground.

When the controller 900 connects the other end of the main relay 500 to the AC power supply unit 10, the controller 900 may connect the other end of the first sub-relay 710 to the inverter 810, may connect the other end of the second sub-relay 720 to the rectifier 830, and may connect the other end of the third sub-relay 730 to the inverter 810. In this case, the rectifier 830 of the DC-DC converter unit 800 may be connected to the second ground. As the controller 900 operates in this way, the AC power-based electrical energy is provided to the load 30 in a state in which a link voltage of the electrical energy stored in the link capacitor 600 (the electrical energy here is AC power-based electrical energy) is converted by the DC-DC converter unit 800. In addition, as the controller 900 connects the other end of the third sub-relay 730 to the inverter 810, a primary side of the transformer 820 is connected to the first ground and a secondary side of the transformer 820 is connected to the second ground. As described above, since the primary side and the secondary side of the transformer 820 are connected to the grounds located at different points, transformer 820 may be expected to be stably operated and electromagnetic interference (EMI) occurring due to a high frequency component of the AC voltage may be minimized.

Meanwhile, when the controller 900 connects the other end of the main relay 500 to the DC power supply unit 20, the controller 900 may connect the other end of the first sub-relay 710 to one end of the bypass path, may connect the other end of the second sub-relay 720 to the other end of the bypass path, and may connect the other end of the third sub-relay 730 to the other end of the load 30. As the controller 900 operates in this way, the DC power-based electrical energy is provided to the load 30 in a state in which the link voltage of the electrical energy (the electrical energy here is DC power-based electrical energy) stored in the link capacitor 600 is not converted by the DC-DC converter unit 800.

The main relay 500, the first sub-relay 710, the second sub-relay 720, and the third sub-relay 730 may be implemented as separate relays. Alternatively, the main relay 500, the first sub-relay 710, the second sub-relay 720, and the third sub-relay 730 may be implemented as a 4-pole double-throw (4PDT) relay.

Figure 12:
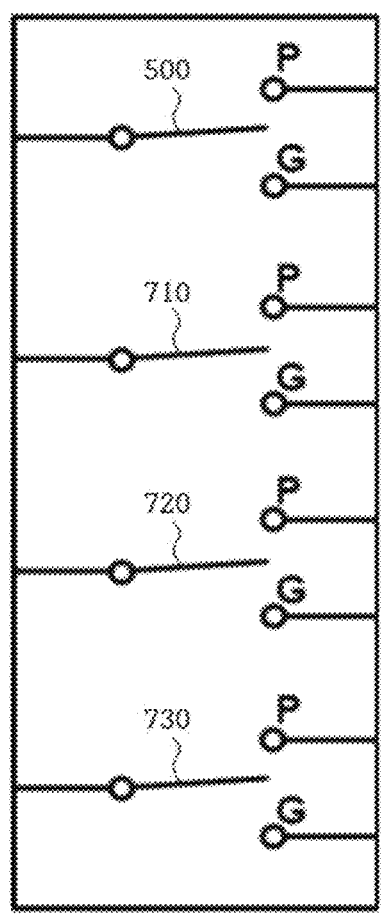
FIG. 12 is a diagram schematically illustrating a state in which a main relay, a first sub-relay, a second sub-relay, and a third sub-relay are implemented as a 4PDT relay.

FIG. 12 is a diagram schematically illustrating a configuration in which the main relay 500, the first sub-relay 710, the second sub-relay 720, and the third sub-relay 730 are implemented as a 4PDT relay. As shown in FIG. 12, when the main relay 500, the first sub-relay 710, the second sub-relay 720, and the third sub-relay 730 are implemented as a 4PDT relay, once the controller 900 transmits one switching operation control signal to the 4PDT relay, the main relay 500, the first sub-relay 710, the second sub-relay 720, and the third sub-relay 730 are collectively connected to contacts G and AC power-based electrical energy output from the AC power supply unit 10 is provided to the load 30. In addition, once the controller 900 transmits another switching operation control signal to the 4PDT relay, the main relay 500, the first sub-relay 710, the second sub-relay 720 and the third sub-relay 730 are collectively connected to the contacts P and the DC power-based electrical energy output from the DC power supply unit 20 is provided to the load 30.

In this way, when the main relay 500, the first sub-relay 710, the second sub-relay 720 and the third sub-relay 730 are implemented as a 4PDT relay, a volume of the system 1000 may be reduced and costs may be reduced, compared to a case in which the main relay 500, the first sub-relay 710, the second sub-relay 720, and the third sub-relay 730 are implemented as separate relays.

Figure 13:
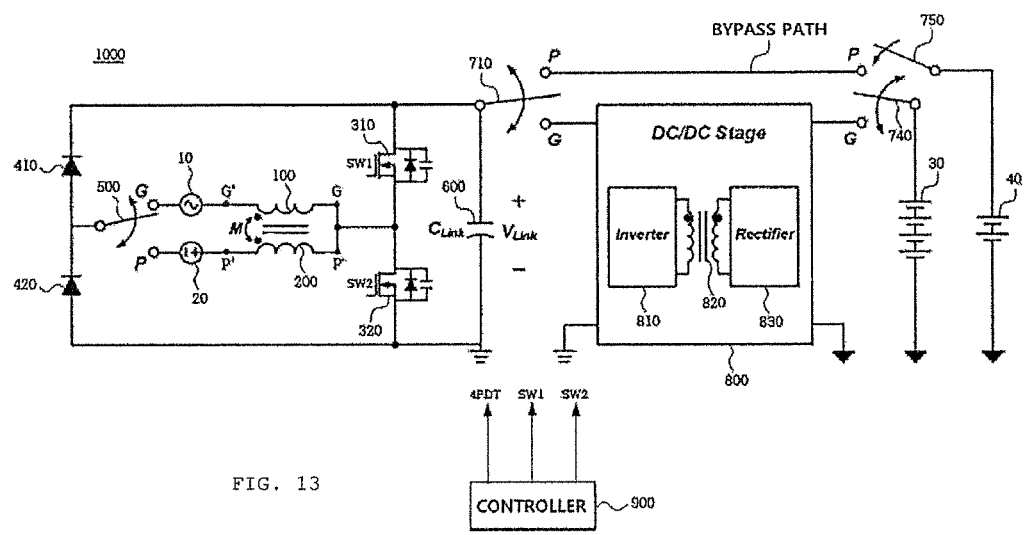
FIG. 13 is a view illustrating an integrated DC/DC and AC/DC converter system according to a fourth exemplary embodiment of the present invention.

FIG. 13 is a view illustrating an integrated DC/DC and AC/DC converter system according to a fourth exemplary embodiment of the present invention.

As shown in FIG. 13, the system according to the fourth exemplary embodiment of the present invention includes a fourth sub-relay 740 and a fifth sub-relay 750, instead of the second sub-relay 720, and further includes an auxiliary load 40 in addition to the load 30, compared with the system according to the first exemplary embodiment of the present invention.

In the system 1000 according to the fourth exemplary embodiment of the present invention, the auxiliary load 40 may be provided with DC power-based electrical energy output from the DC power supply unit 20 according to a switching operation control of the controller 900. When the auxiliary load 40 is additionally provided, the load 30 is provided with AC power-based electrical energy output from the AC power supply unit 10, and the auxiliary load 40 is provided with a DC power-based electrical energy output from the DC power supply unit 20.

The auxiliary load 40 may be a battery (i.e., an auxiliary battery) mounted on an electric vehicle, and an auxiliary battery (i.e., the auxiliary load 40) may have a rated voltage lower than that of the battery (i.e., the load 30). In addition, as mentioned above, a voltage of the DC power supplied from the solar panel (i.e., the DC power supply unit 20) is lower than the voltage of the AC power supplied from the grid (i.e., the AC power supply unit 10). Accordingly, the voltage of DC power supplied from the solar panel (i.e., the DC power supply unit 20) may be provided to the auxiliary battery (i.e., the auxiliary load 40) having a rated voltage lower than the battery (i.e., the load 30), without undergoing a voltage conversion process by the DC-DC converter unit 800.

One end of the first sub-relay 710 is connected to one end of the link capacitor 600, and the other end of the first sub-relay 710 is selectively connected to any one of the inverter 810 and one end of the bypass path.

One end of the fourth sub-relay 740 is connected to one end of the load 30, and the other end of the fourth sub-relay 740 is connected to or disconnected from the rectifier 830.

One end of the fifth sub-relay 750 is connected to one end of the auxiliary load 40, and the other end of the fifth sub-relay 750 is connected to or disconnected from the other end of the bypass path.

When the controller 900 connects the other end of the main relay 500 to the AC power supply unit 10, the controller 900 may connect the other end of the first sub-relay 710 to the inverter 810, may connect the other end of the fourth sub-relay 740 to the rectifier 830, and may disconnect the other end of the fifth sub-relay 750 from the other end of the bypass path. As the controller 900 operates in this way, the AC power-based electrical energy is provided to the load 30 in a state in which the link voltage of the electrical energy (the electrical energy here is AC power-based electrical energy) stored in the link capacitor 600 is converted by the DC-DC converter unit 800.

Meanwhile, when the controller 900 connects the other end of the main relay 500 to the DC power supply unit 20, the controller 900 may connect the other end of the first sub-relay 710 to one end of the bypass path, disconnect the other end of the fourth sub-relay 740 from the rectifier 830, and may connect the other end of the fifth sub-relay 750 to the other end of the bypass path. When the controller 900 operates in this way, the DC power-based electrical energy is provided to the auxiliary load 40 in a state in which the link voltage of the electrical energy (the electrical energy here is DC power-based electrical energy) stored in the link capacitor 600 is not converted by the DC-DC converter unit 800.

Figure 14:
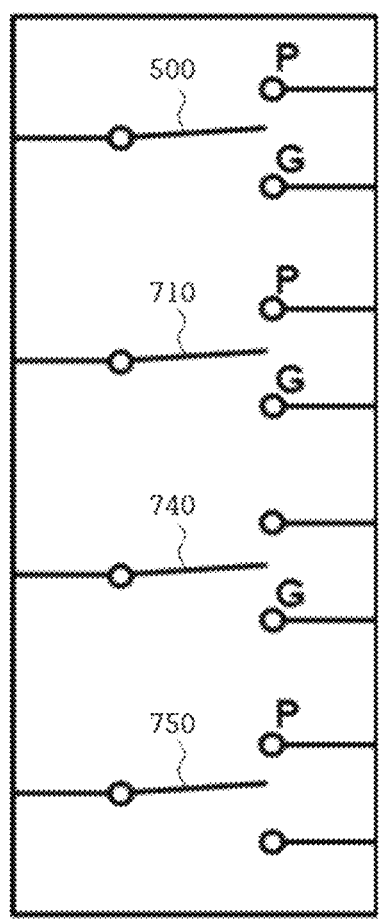
FIG. 14 is a diagram schematically illustrating a state in which a main relay, a first sub-relay, a fourth sub-relay, and a fifth sub-relay are implemented as a 4PDT relay

FIG. 14 is a diagram schematically illustrating a state in which the main relay 500, the first sub-relay 710, the fourth sub-relay 740, and the fifth sub-relay 750 are implemented as a 4PDT relay. As shown in FIG. 14, when the main relay 500, the first sub-relay 710, the fourth sub-relay 740, and the fifth sub-relay 750 are implemented as a 4PDT relay, once the controller 900 transmits one switching operation control signal to the 4PDT relay, the main relay 500, the first sub-relay 710, and the fourth sub-relay 740 are collectively connected to the contacts G, the fifth sub-relay 750 is disconnected from the other end of the bypass path, and the AC power-based electrical energy output from the AC power supply unit 10 is provided to the load 30. In addition, once the controller 900 transmits another switching operation control signal to the 4PDT relay, the main relay 500, the first sub-relay 710, and the fifth sub-relay 750 are collectively connected to the contacts P, the fourth sub-relay 740 is disconnected from the rectifier 830, and the DC power-based electrical energy output from the DC power supply unit 20 is provided to the auxiliary load 40.

In this way, when the main relay 500, the first sub-relay 710, the fourth sub-relay 740, and the fifth sub-relay 750 are implemented as a 4PDT relay, a volume of the system 1000 may be reduced and costs may be reduced, compared to a case in which the main relay 500, the first sub-relay 710, the fourth sub-relay 740, and the fifth sub-relay 750 are implemented as separate relays.

As described above, although the present invention has been described with reference to the limited exemplary embodiments and drawings, the present invention is not limited to the above exemplary embodiments, and those skilled in the art to which the present invention pertains may make various modifications and variations from the description. For example, the third switch 330 and the fourth switch 340 according to the second exemplary embodiment may be used instead of the first diode 410 and the second diode 420 of the third exemplary embodiment and the fourth exemplary embodiment. Also, the third sub-relay 730 according to the third exemplary embodiment may also be applied to the fourth exemplary embodiment. The technical spirit of the present invention should be understood only by the claims and all equivalents or equivalent modifications thereof will fall within the scope of the technical spirit of the present invention.

The present invention includes the main relay selectively connected to any one of the AC power supply unit and the DC power supply unit and the controller for controlling the switching operation of the main relay, that is, connecting the main relay to the AC power supply unit or the DC power supply unit. Therefore, the AC power-based electrical energy output from the AC power supply unit and the DC power-based electrical energy output from the DC power supply unit may be selectively provided to the load. That is, in the present invention, the controller is configured to connect the main relay to the AC power supply in an environment in which AC power is provided, and to connect the main relay to the DC power supply in an environment in which DC power is provided, and thus, electrical energy may be transferred to the load, regardless of a type of provided power.

In addition, according to the present invention, the boost PFC converter (refer to FIG. 1) used in the related art OBC and the boost converter (refer to FIG. 2) used in the related art photovoltaic system are integrated into one boost converter. Accordingly, the number of elements may be reduced compared to the case of simply combining a system for providing electrical energy based on AC power to a load and a system for providing electrical energy based on DC power to a load in the related art, thereby reducing the volume of the system and costs thereof.

[Detailed Description of Main Elements]

| | |
|---|---|
| 10: AC power supply unit | 20: DC power supply unit |
| 30: load | 40: auxiliary load |
| 100: first inductor | 200: second inductor |
| 310: first switch | 320: second switch |
| 330: third switch | 340: fourth switch |
| 410: first diode | 420: second diode |
| 500: main relay | 600: link capacitor |
| 710: first sub-relay | 720: second sub-relay |
| 730: third sub-relay | 740: fourth sub-relay |
| 750: fifth sub-relay | 800: DC-DC converter unit |
| 810: inductor | 820: transformer |
| 830: rectifier | 900: controller |
| 1000: integrated DC/DC and AC/DC converter system | |

What is claimed is:

1. An integrated DC/DC and AC/DC converter system comprising:
    a first inductor having one end connected to an AC power supply unit;
    a second inductor having one end connected to a DC power supply unit;
    a first switch having one end connected to the other end of the first inductor and the other end of the second inductor;
    a second switch having one end connected to the other end of the first inductor, the other end of the second inductor, and the one end of the first switch;
    a main relay having one end connected to the other end of the first switch and the other end of the second switch and the other end selectively connected to any one of the AC power supply unit and the DC power supply unit;
    a controller controlling a switching operation of the first switch, the second switch, and the main relay to provide, to a load, an AC power-based electrical energy output from the AC power supply unit or a DC power-based electrical energy output from the DC power supply unit;
    a link capacitor having one end connected to the other end of the first switch and the other end connected to the other end of the second switch, and storing the AC power-based electrical energy output from the AC power supply unit or the DC power-based electrical energy output from the DC power supply unit according to the switching operation controlled by the controller;
    an inverter converting a link voltage of an electrical energy stored in the link capacitor into an AC voltage;
    a transformer transforming the AC voltage converted by the inverter;
    an AC-DC converter unit converting the AC voltage transformed by the transformer into a DC voltage and providing the DC voltage to the load;
    a first sub-relay having one end connected to the one end of the link capacitor and the other end selectively connected to any one of the inverter and one end of a bypass path; and
    a second sub-relay having one end connected to one end of the load and the other end selectively connected to any one of the rectifier and the other end of the bypass path,
    wherein the load is provided with electrical energy stored in the link capacitor, and
    wherein;
    when the controller connects the other end of the main relay to the AC power supply unit, the controller connects the other end of the first sub-relay to the inverter and connects the other end of the second sub-relay to the rectifier, so that the electrical energy is provided to the load in a state in which the link voltage of the electrical energy stored in the link capacitor is converted by the AC-DC converter unit, and
    when the controller connects the other end of the main relay to the DC power supply unit, the controller connects the other end of the first sub-relay to the one end of the bypass path and connects the other end of the second sub-relay to the other end of the bypass path, so that the electrical energy is provided to the load in a state in which the link voltage of the electrical energy stored in the link capacitor is not converted by the AC-DC converter unit.

2. The integrated DC/DC and AC/DC converter system of claim 1, wherein the controller connects the other end of the main relay to the AC power supply unit and alternately turns the first switch and the second switch on or off so that the AC power-based electrical energy output from the AC power supply unit is provided to the load.

3. The integrated DC/DC and AC/DC converter system of claim 1, wherein the controller connects the other end of the main relay to the DC power supply unit and alternately turns the first switch and the second switch on or off so that the DC power-based electrical energy output from the DC power supply unit is provided to the load.

4. The integrated DC/DC and AC/DC converter system of claim 3, wherein the controller controls a duty ratio of the first switch and the second switch so that DC power generated by the DC power supply unit is maximized according to a temperature of the DC power supply unit and an amount of insolation incident on the DC power supply unit.

5. The integrated DC/DC and AC/DC converter system of claim 1, further comprising:
    a first diode including an anode electrode connected to the one end of the main relay and a cathode electrode connected to the other end of the first switch; and
    a second diode including an anode electrode connected to the other end of the second switch and a cathode electrode connected to the one end of the main relay.

6. The integrated DC/DC and AC/DC converter system of claim 1, wherein the first inductor and the second inductor share the same core and are magnetically coupled to each other.

7. The integrated DC/DC and AC/DC converter system of claim 1, wherein the main relay, the first sub-relay, and the second sub-relay are implemented as a 3-pole double-through (3PDT) relay.

* * * * *